United States Patent Office 3,464,183
Patented Sept. 2, 1969

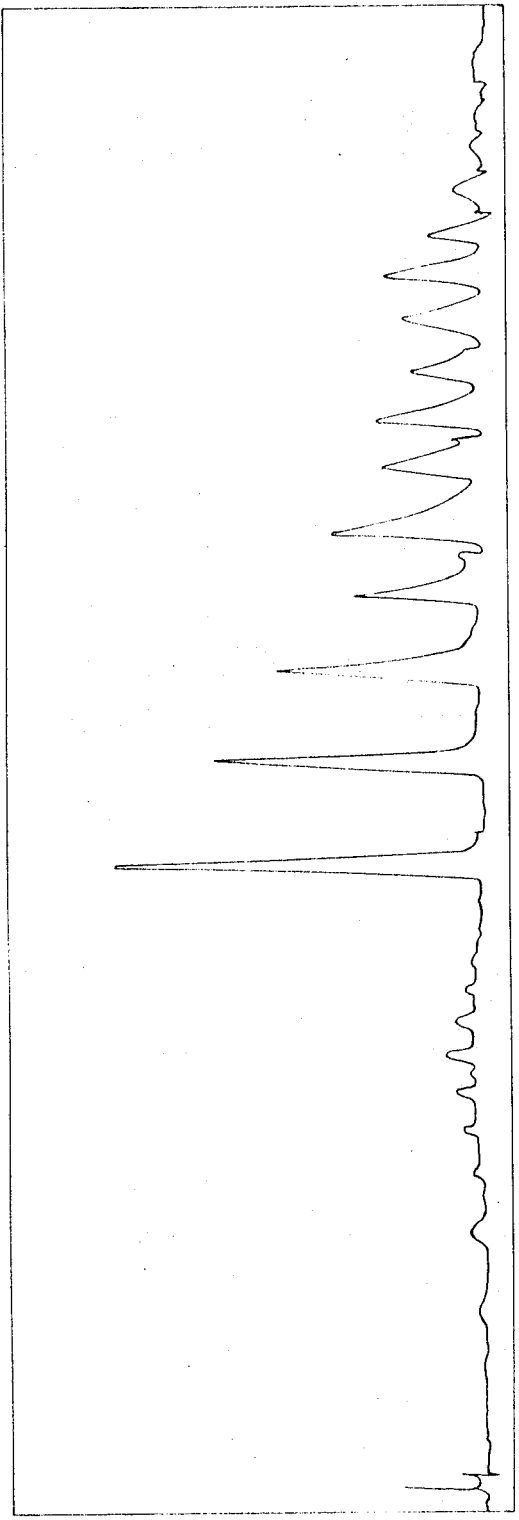

3,464,183
CHROMATOGRAPHIC SEPARATION METHOD
David J. Gordon, Essexville, Mich., assignor to Dow
Corning Corporation, Midland, Mich., a corporation of
Michigan
Filed Oct. 7, 1966, Ser. No. 585,020
Int. Cl. B01d *15/08*
U.S. Cl. 55—67          4 Claims

ABSTRACT OF THE DISCLOSURE

Improved chromatographic substrates for use in chromatographic columns, said substrates being capable of withstanding temperatures of up to about 420° C. In addition, the substrates of the present invention result in a far more efficient separation of pertinent components and also have a substantially longer service life than these known heretofore. Illustrative of the substrates which can be employed herein is a polydimethylsilmethylene polymer having an intrinsic viscosity of at least 0.10.

---

This invention relates to improved chromatographic separation and more particularly to the use of specific polymers as the substrate.

Partition chromatographic analyses are conducted by placing in an elongate column a finely divided solid material (normally referred to as a substrate support) which has been coated with a suitable liquid or solid partitioning agent (normally referred to as the substrate). A fluent carrier is continuously passed through the thus-prepared column and a sample of a fluent material to be analyzed is thereafter injected into the carrier whereby the sample is resolved into its component parts as it floats through the chromatographic column and whereby the individual components of the sample may be detected in any suitable manner.

For many years the use of chromatography as a rapid and accurate method for analysis has proven invaluable to the chemical and related industries. However, recent instrumentation improvements in technology and the like have caused the chromatographic instrument to surpass the development of suitable chromatographic columns. Of major importance is the fact that present chromatographic instruments can now attain temperatures of approximately 500° C. which is far beyond the capability of the most thermally stable current chromatographic substrates which degrade in a temperature range of from approximately 300° C. to 350° C.

It is thus an object of this invention to provide a novel substrate for use in chromatographic columns that can withstand temperatures of up to about 420° C.

It is also an object of the present invention to provide new substrates for use in chromatographic columns that result in a far superior and more efficient separation of components than was heretofore possible.

It is a further object of this invention to provide novel substrates that have a longer service life than those presently available.

It is still a further object of this invention to provide substrates for use in chromatographic columns that can effectively elute mixtures of para-phenyl and ortho-phenyl phenol and mixtures of phenyl benzoate, catechol, resorcinol, and hydroquinone dibenzoates as well as siloxanes.

It is also an object of this invention to provide substrates that can operate isothermically at temperatures of up to about 450° C.

These and other objects will become readily apparent from the following detailed description of the invention which follows.

This invention relates to a chromatographic separation method, the improvement which comprises utilizing as a substrate, a substrate selected from the group consisting of a polymer and copolymer of the unit formula

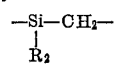

in which R is a member selected from the group consisting of methyl, phenyl, vinyl, and 3,3,3,-trifluoropropyl, said substrate having an intrinsic viscosity of at least 0.1.

The above polymer can be prepared by polymerizing a cyclic of the formula

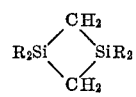

wherein R is as above defined which comprises contacting said cyclic under substantially anhydrous conditions in the presence of the heat with or without a platinum-containing material. The above method is well known in the art as illustrated by copending U.S. patent application, Ser. No. 547,750, filed May 6, 1966.

Coating of the substrate support is readily achieved by dissolving the polymer or copolymer, from which undesirable low molecular weight material has been preferably removed by a process such as fractional distillation, extraction, or the like, in any suitable solvent that evaporates rather rapidly such as hexane, methylene chloride, pentane, acetone, cyclohexane, toluene, and benzene, among many others. The polymer or copolymer is dissolved in the appropriate solvent until it is well dispersed and a homogeneous solution is apparent. The homogeneous solution is subsequently poured over the solid substrate support or the solid substrate support is added to the homogeneous solution. The admixture is then stirred in an attempt to insure that the individual particles of the substrate support are as completely and uniformly coated with the homogeneous solution as possible. The coated substrate support is then spread in a thin layer or otherwise allowed to air dry until the solvent is virtually completely evaporated. If facilitation of the drying procedure is desired, the coated substrate support can be placed in an air-circulating oven, a Renco Evaporator, a vacuum oven, or any other available means which will more rapidly volatilize the solvent which may be present.

It is to be noted that a wide variety of materials can be selected as the substrate support. For example, one of the most successfully used to date has been some form of diatomaceous earth. Diatomaceous earths typically have a surface area of a few square meters per gram yet the pore structure is large compared to molecular dimensions. Other materials which are commonly employed as the substrate support include untreated firebrick or a firebrick which has been treated with an available substance to minimize chemical or physical surface reactions with the substrates of this invention, and synthetic silica having a low surface area, among numerous others.

As is well known, size classification of the material employed as the substrate support is important if one is to achieve significant results. A narrow range of particle size is desired; hence, for columns in the range of 6 to perhaps 18 ft. in length, 42 to 60 mesh have proved excellent, whereas for columns 2 ft. or below in length, 60 to 80 mesh has proved quite satisfactory.

Once the substrate support is properly coated the column is packed with the material. It is to be noted that one end of the column is stoppered with any suitable porous material such as glass wool or the like and the coated substrate support placed therein. To insure that the column is consistently packed, it can be vibrated by mechanical means and additional coated substrate support is added as required. Upon completion of packing, the other end of the column is also stoppered with the porous material and the column is then properly prepared for fitting to the selected chromatographic apparatus.

The amount of substrate added to the substrate support is not critical with the exception that there must be at least 1.0 percent substrate present based on the total weight of the substrate and substrate support. Depending upon the particular application or type of analysis to be pursued, the amount of substrate employed can vary within a wide range. For example in some cases, 1.0 percent of the substrate shall be sufficient, whereas in other cases up to 30 percent or more of the substrate based on the total weight of the substrate and substrate support may be desired.

Many carrier gases can be used to achieve the objects of this invention. In routine analysis, it is generally preferable to employ a carrier gas that does not form explosive mixtures with air. Hence, helium, nitrogen, argon, neon, krypton, and xenon can all be effectively used without fear of deleterious effects resulting therefrom.

The polymers or copolymers defined above for use as the substrate of the present invention should have an intrinsic viscosity of at least 0.1. The polymer or copolymer should have a minimum intrinsic viscosity of this figure so that it is nonvolatile at the desired operating temperatures. The maximum intrinsic viscosity is not critical, and it can vary widely depending upon the particular application or type of analysis conducted. In some cases it may be preferable that the intrinsic viscosity of the polymer or copolymer be 0.1, whereas in other cases it may be preferably as high as 1.5 or higher.

By using the novel substrates of this invention, one can extend the molecular weight range of the material to be analyzed. By increasing the operating temperature of the chromatographic analysis, a more precise and exacting separation is obtained. For example, in the metabolic trade, one can extend the range of the material to be analyzed to go to higher fatty acids, amines, and more complex steroids, etc. It is to be noted that the substrates of this invention can also be employed with dual columns and equally or more gratifying and superior results as those achieved on a single column are obtained.

The invention will be further illustrated with reference to the accompanying drawings wherein:

FIG. 2 is a reproduction of a representative strip chart recording in which the substrate support was coated with a commercially available siloxane.

Example 1

Figure 1:
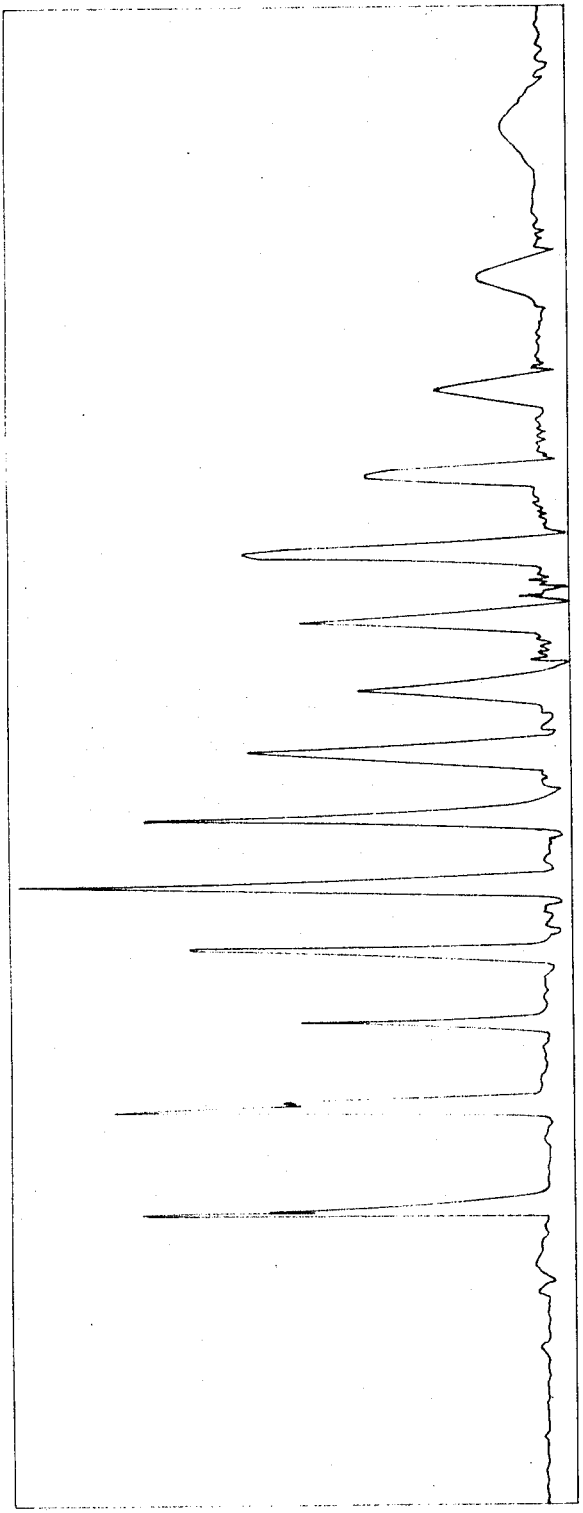
FIG. 1 is a reproduction of a representative strip chart recording in which the substrate support was coated with a polydimethylsilmethylene polymer.

2 grams of a polydimethylsilmethylene polymer having an intrinsic viscosity of 0.33 was mixed with 15.3 grams of hexane and thoroughly stirred until a homogeneous solution was obtained. The above homogeneous solution was then added to 38.0 grams of Chromosorb W, a commercially available diatomaceous earth. Additional hexane was then included to completely immerse the Chromosorb W in the solvent solution.

The complete admixture was then stirred at room temperature and subsequently placed in a 50° C. oven for approximately 10 hours to insure that substantially all of the solvent was volatilized.

A 2' x ¼" stainless steel column was then appropriately packed with the coated substrate support and the column was then installed on the chromatographic apparatus.

A dimethylcyclosiloxane mixture was then injected in the column and analyzed by generally accepted chromatographic methods. The strip chart recording reproduced in FIG. 1 was obtained.

The above procedure was repeated with the exception that a commercially available siloxane was substituted for the corresponding polydimethylsilmethylene. The strip chart recording reproduced in FIG. 2 was obtained.

Note in FIG. 1, the pronounced efficiency in the analysis as opposed to that obtained in FIG. 2. A comparison of the two figures clearly indicates that in FIG. 2 there is an obvious tailing of peaks and the peaks are highly asymmetrical. In contrast, FIG. 1 illustrates excellent symmetry of peaks in which there is substantially no tailing.

It is also of importance to note that the last peak in FIG. 1, reading from left to right, represents a compound containing 54 siloxane units, whereas the last peak in FIG. 2 represents a compound containing only 48 units. Hence, higher molecular weight species can be eluted when employing polydimethylsilmethylene as the substrate for the substrate support.

Example 2

When the following compounds were substituted for the polydimethylsilmethylene of Example 1 and comparatively tested as in Example 1, equivalent results were obtained.

(A) Polyphenylmethylsilmethylene
(B) Polyvinylmethylsilmethylene
(C) 3,3,3-trifluoropropylmethylsilmethylene
(D) Polydiphenylsilmethylene
(E) Polydivinylsilmethylene
(F) Polyditrifluoropropylmethylsilmethylene
(G) A copolymer of polyphenylmethylsilmethylene and polyvinylmethylsilmethylene
(H) A copolymer of 3,3,3-trifluoropropylmethylsilmethylene and polydiphenylsilmethylene
(I) A copolymer of polydimethylsilmethylene and polyvinylmethylsilmethylene.

Example 3

The procedures of Example 1 were followed employing polydimethylsilmethylene as the substrate for the substrate support with the exception that mixtures of (A) ortho and para-phenyl phenol, and (B) phenyl benzoate, catechol, resorcinol, and hydroquinone dibenzoate, were injected in the column and subjected to analysis. Excellent peak shape and peak response was noted. In addition, when employing polydimethylsilmethylene as the substrate for the substrate support, dibenzoates were capable of separation for the first time.

That which is claimed is:

1. In a chromatographic method for separating organic compounds, the improvement which comprises utilizing as a substrate, a substrate selected from the group consisting of a polymer and coplymer of the unit formula

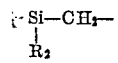

in which R is a member selected from the group consisting of methyl, phenyl, vinyl, and 3,3,3-trifluoropropyl, said substrate having an interinsic viscosity of at least 0.1.

2. The method as recited in claim 1 in which the substrate in polydimethylsilmethylene.

3. The method as recited in claim 2 in which the polydimethylsilmethylene has an intrinsic viscosity of 0.33.

4. The method as recited in claim 1 in which the substrate is a copolymer of polydimethylsilmethylene and polyvinylmethylsilmethylene.

References Cited

UNITED STATES PATENTS 3,169,389 2/1965 Green et al. _____ 55—386 X
3,248,856 5/1966 Guillemin et al. _____ 55—67

OTHER REFERENCES

Gas Chromatography Abstracts, 1965, 448, p. 89.
Gas Chromatography Abstracts, 1963, 769, p. 144.

JAMES L. DECESARE, Primary Examiner